March 6, 1928. 1,661,775
F. STREICH
BUN AND BREAD ROUNDER
Filed July 7, 1927  3 Sheets-Sheet 3
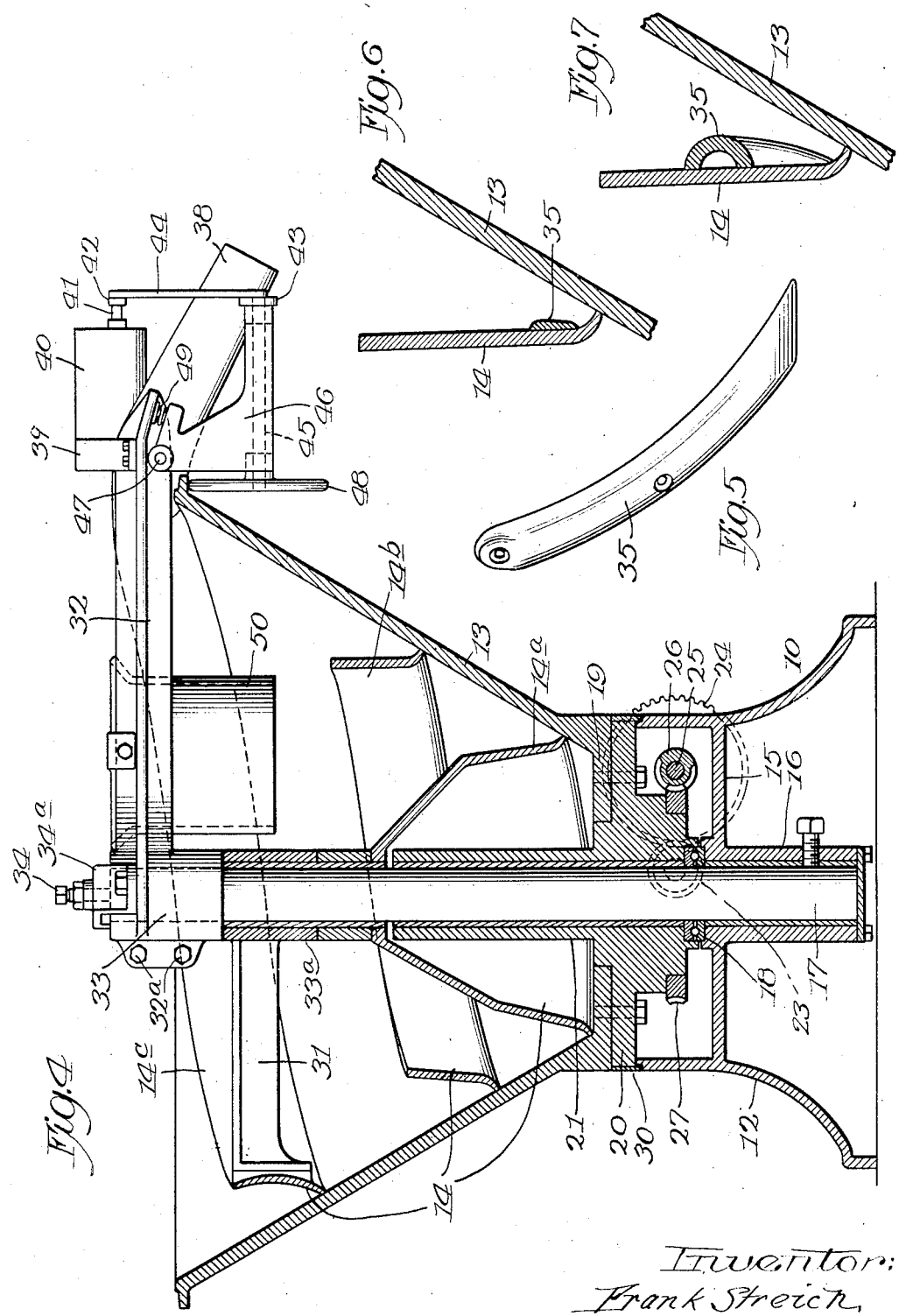
Inventor:
Frank Streich,
By Charles O. Sherry
Atty.

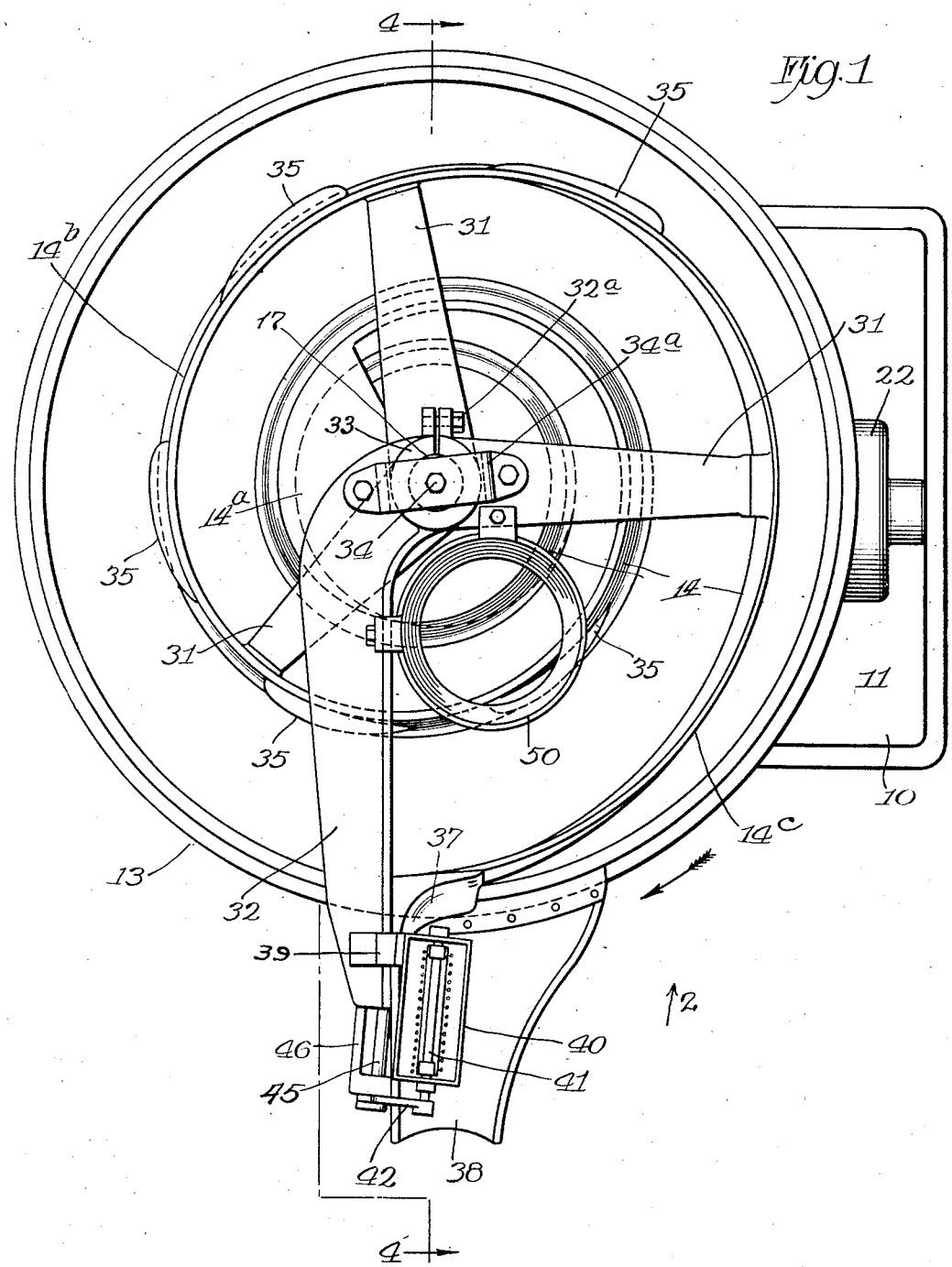

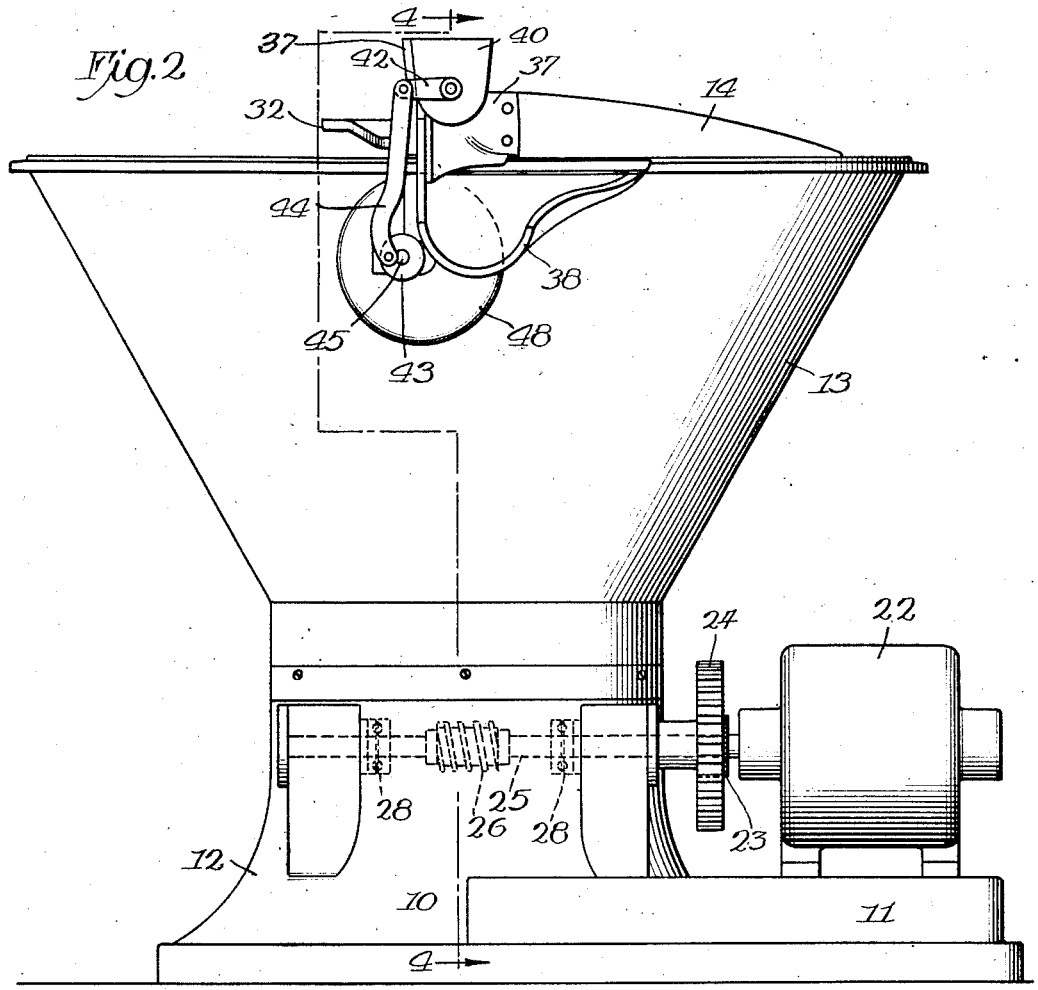
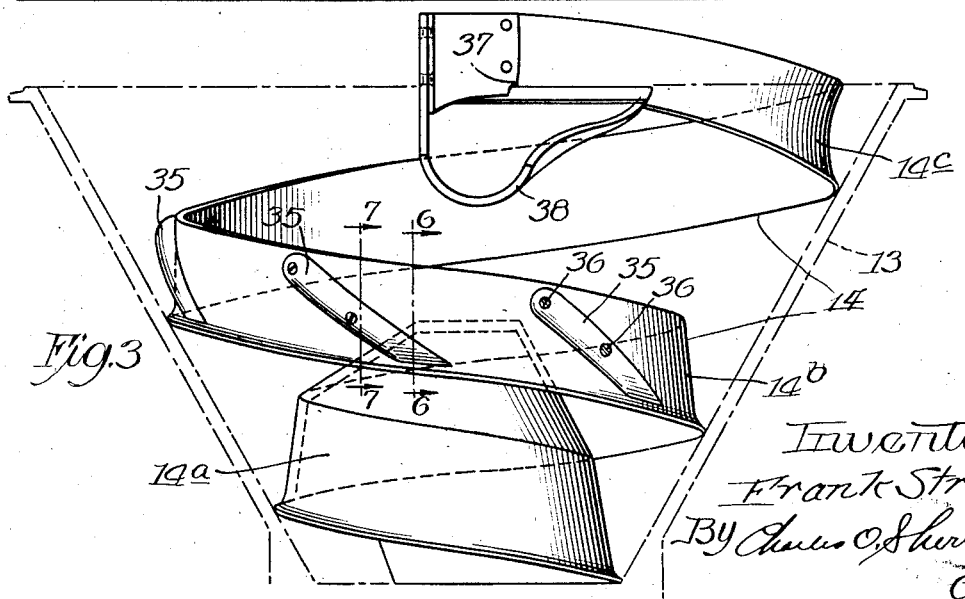

Patented Mar. 6, 1928.

1,661,775

UNITED STATES PATENT OFFICE.

FRANK STREICH, OF JOLIET, ILLINOIS, ASSIGNOR TO UNION MACHINERY COMPANY, OF JOLIET, ILLINOIS, A CORPORATION OF ILLINOIS.

BUN AND BREAD ROUNDER.

Application filed July 7, 1927. Serial No. 203,932.

This invention relates to bun and bread rounders and its principal object is to increase the efficiency of machines of this character. The invention has particular reference to that type of rounding up machines, which employs a rotating, hollow dough carrier in connection with a stationary, spirally arranged mold board contacting along its lower edge with the inner surface of the carrier. When using this type of rounding up machine with certain kinds of dough and particularly where large machines are used, better results are obtained if the lumps of dough are kneaded while being rounded up and I have discovered that the use of inclined kneaders on the spiral mold board give this result, the kneaders giving to the lumps of dough more of the action of the heel of the hand when kneading the dough by hand. One object is to provide kneaders on the spiral mold board, which operate to lift and stretch the portion of the lumps of dough next to the kneader as the lumps pass by the kneaders, the latter operating also to press in the sides of the lumps as they pass, thereby more thoroughly kneading and aerating them. Another object is to provide improved means whereby the rounded up lumps of dough may be discharged at any desired place around the sides of the machine. Another object is to provide improved means for dusting flour or the like upon the rounded up lumps of dough.

With these and other objects and advantages in view, this invention consists in a rounding up machine embodying a rotating, hollow dough carrier, in connection with a stationary, spirally formed mold board contacting therewith and having a plurality of stationary kneaders on the outer surface of the mold board co-operating with the rotating carrier to more effectively knead the lumps of material. The invention further consists in a rounding up machine having a rotating bowl like dough carrier, a stationary, spirally arranged mold board contained in the hollow thereof and contacting with the internal face of the carrier and supporting arms for said mold board, in connection with a discharge chute secured to one of the supporting arms; the mold board, arms and discharge chute being adjustable angularly in the hollow of the dough carrier, whereby the position of the discharge chute may be varied at will. The invention further consists in a rounding up machine having a dusting apparatus carried by said arm and means for agitating an element of the dusting apparatus, including a wheel held in frictional engagement with the rotating dough carrier, whereby motion is transmitted to said element. The invention further consists in the several novel features of construction, arrangement and combination of parts hereinafter fully set forth and claimed.

The invention is clearly illustrated in the drawings accompanying this specification, in which:

Fig. 1 is a plan of a rounding up machine embodying a simple form of the present invention; Fig. 2 is a side elevation thereof looking in the direction of the arrow 2 in Fig. 1; Fig. 3 is a detail side elevation of the mold board, kneaders and discharge chute which form part of the present invention, said view also being in the direction of the arrow 2 in Fig. 1 and a fragment of the dough carrier being shown in dotted lines; Fig. 4 is a vertical cross section taken on the line 4—4 of Fig. 1; Fig. 5 is a perspective view of one of the kneaders; Fig. 6 is a detail vertical section taken on the line 6—6 of Fig. 3 and Fig. 7 is a detail vertical section taken on the line 7—7 of Fig. 3.

This invention is in the nature of an improvement on the bun and bread rounder shown and described in my prior Patent No. 1,152,348, dated August 31, 1915.

Referring to the drawings accompanying this specification, which illustrate a simple embodiment of the present invention, the reference character 10 designates a base having a platform 11 at one end and a housing 12 at the other end. Rotatively supported upon said housing is a dough carrier 13, here shown in the form of a bowl or an inverted hollow cone closed at the bottom and open at the top, and within the hollow of said cone is a spiral mold board 14, which is stationarily mounted upon said base 10. The internal face of the dough carrier may contain the shallow grooves and ridges shown in my prior patent above referred to. While the exact construction of the base and housing is not material to the present invention, broadly considered, these parts have been designed to produce a substantial and practical construction in rounding up the machine. As shown, the housing 12 is formed with a horizontal supporting wall 15 from the lower side of which extends a hollow boss 16, in which is rigidly secured by a set screw or otherwise, a post or standard 17 that forms the stationary support for the mold board 14. The dough carrier 13 is rotatively mounted on the post 17 and is supported upon the horizontal wall 15 of the housing 12 and as a preference ball bearings 18 are provided between the carrier and wall 15 to reduce friction. The dough carrier 13 is formed with a bottom wall 19 to which is bolted or otherwise secured a hub portion 20 and said hub portion 20 is formed with a sleeve like projection 21, which extends upward therefrom and into the hollow of the dough carrier 13 where it surrounds the post 17. Means are provided for rotating the dough carrier, and as shown said means comprise an electric motor 22 mounted on the platform 11 of the base, and geared to said carrier. The gearing may comprise speed reducing gears 23, 24 between the motor and a countershaft 25 journaled in suitable bearings contained in the housing 12 and having thereon a worm pinion 26, which meshes with a worm gear 27, secured upon the lower end of the hub member 20 of the dough carrier. Suitable ball bearings 28 may be provided for the countershaft 25 to take up any end thrust that may occur therein. Conveniently the upper end of the housing 12 surrounds and encloses the worm gears, and a ring 30 secured to the hub portion 21, extends down over the upper edge portion of the housing 12 and makes a fairly dust proof joint between the housing and dough carrier.

The mold board 14 is stationarily supported within the bowl like dough carrier 13 and extends from the bottom to the top thereof in spiral like formation, its lower edge contacting with the internal face of the dough carrier throughout the length of the mold board. The mold board preferably consists of a number of sections, the lowermost one 14$^a$ of which is in the form of a cone like member and the other sections 14$^b$, 14$^c$ of which form a continuous strip or plate that extends to the top or discharge end of the mold board. The sections 14$^b$, 14$^c$ are secured to supporting arms 31, 32, which are formed with hub portions 33, 33$^a$ that surround the post or standard 17, and the uppermost hub portion 33 is split as seen in Fig. 1 and provided with clamp screws 32$^a$, whereby the entire mold board may be rigidly secured to the post or standard 17. By loosening the screws 32$^a$, the mold board may be adjusted to bring its entire lower edge in contact with the internal face of the dough carrier and this clamp connection provides means whereby the entire mold board and parts connected therewith may be turned upon the post or standard 17 to bring the discharge end of the mold board at any desired position around the sides of the dough carrier. An adjustment stud 34 threaded in a bracket 34$^a$ secured to the arms 31, 32 and bearing upon the top of the post or standard 17, provides means for raising or lowering the mold board to adjust it relative to the internal face of the dough carrier.

The outer face of the mold board, which is the one adjacent the internal face of the dough carrier, is preferably inclined toward the axis of the post 17, for a considerable portion of its length, starting at the bottom of the cone, and said inclined face, together with the inclined internal face of the dough carrier form a somewhat V shaped trough, through which the lumps of dough or other material are rolled, and as a preference the angle between the outer face of the mold board and internal face of the dough carrier is considerably greater near the bottom of the mold board than at the middle and upper portions thereof, said angle gradually being reduced from the bottom towards the upper end as shown. The upper end of the mold board, for instance the last half turn thereof is made concave in cross section as is seen in Figs. 3 and 4 the concavity facing the internal face of the dough carrier. I have found that by giving the mold board the shape described, the lumps of dough are more perfectly rounded up and a better skin texture is given to them.

In order to more thoroughly knead the lumps of dough as they progress from the bottom of the mold board to the discharge end thereof, I have provided a series of kneaders or kneading ribs 35, which are disposed around the outer face of the mold board and extend in oblique lines running in the same general direction as the spiral mold board, as is clearly seen in Fig. 3. The extreme lower edges of the kneaders are straight and run approximately parallel with the lower edges of the mold board. At this place the outer face of each kneader is substantially flat or at least has very little convexity and from said flattened portion the outer face of each kneader takes a convex form, as is seen in Figs. 6 and 7, the greatest convexity being approximately midway between the ends of said kneaders, and from said place the convexity becomes less towards the upper ends of the kneaders. The kneaders are spaced apart some little distance, as is seen in Fig. 3, and when made separately from the mold board, may be secured to the mold board by screws, rivets or the like 36. The inner faces of the kneaders are made contiguous with and conform to the outer face of the mold board fitting tightly against the same. It will be observed that when a lump of dough, which is being rolled up the spiral mold board by the rotating dough carrier, reaches one of the kneaders or kneading ribs, the lower portion of the dough adjacent the mold board, first encounters the kneading rib and is lifted, as it were, and as the lump continues along the kneader that side of the lump adjacent the kneader is lifted while the outer side is rolled and drawn downward whereby the axis of the lump is changed considerably in passing the kneader and the dough is stretched and pressed inward by an action more like that which occurs when the baker kneads the lumps of dough with his hand.

Between the discharge end of the mold board and the arm 32 (see Figs. 1, 2 and 3) is a curved deflecting plate 37 which is bolted or otherwise secured to the mold board 14 and arm 32, said plate having a concave face on its outer side, which serves to aid in deflecting the lumps of dough from the mold board when they reach the discharge end thereof. Below said reflecting plate is an inclined discharge chute 38, which is secured to the arm 32 and at its upper edge extends along the upper edge of the dough carrier for a short distance as is clearly seen in Fig. 1. The bottom of the discharge chute may be shaped to provide a trough like chute through which the rounded up lumps of dough are discharged from the machine and delivered to the conveyor or other apparatus for conveying the rounded up lumps of dough to another machine for a subsequent treatment.

Supported upon the arm 32 by brackets 39 or otherwise is a flour sifter 40 of conventional form, the stirrer shaft 41 of which projects from the sifter and is oscillated by mechanism driven from the rotating dough carrier 13. As shown said mechanism comprises an arm 42 on the stirrer shaft 41 and connected to a crank arm or disc 43 by a link 44, and said disc is mounted upon a shaft 45 which is journaled in lugs formed upon a bracket 46, which is suspended from the arm 32 by a pivotal connection such as a bolt 47 (see Fig. 4). Upon the inner end of the shaft 45 is a friction disc or wheel 48, which engages with the underside of a rim formed on the dough carrier 13 and is rotated thereby while the carrier is in motion. The fulcrum of the bracket 46 on the arm 32 is located at the end of the bracket nearest the friction disc 48 whereby the weight of said bracket may be sufficient to hold the friction disc 48 in frictional contact with the rim of the dough carrier 13. However, a coiled compression spring 49 may be interposed between the arm 32 and bracket 46 as is seen in Fig. 4 to increase the pressure of the friction disc 48 on rim of the dough carrier 13. It is obvious that so long as the dough carrier is rotating, the friction disc will be rotated and thereupon the agitating mechanism of the sifter 40 will be oscillated through the instrumentality of the friction disc 48 and connections between it and stirrer shaft 41.

Supported upon the arms 31, 32 is a hopper or feed tube 50 which is located in position to deliver lumps of dough into the bottom of the V shape trough between the cone member 14$^a$ of the spiral mold board and the internal face of the dough carrier.

In the operation of the machine, lumps of dough are delivered to the hopper or feed tube 50 from a suitable divider, as is well understood, and the lumps of dough fall into the bottom of the V shaped trough or grooves between the cone like part 14$^a$ of the spiral mold board and the internal face of the dough carrier. It is understood that the dough carrier is rotated in the direction of the arrow shown adjacent the dough carrier in Fig. 1. The lumps of dough are rolled up the inclined or spiral outer face of the mold board and as each lump encounters a kneading rib, the part of the dough adjacent the mold board is lifted relative to the remainder of the lump, and stretched and this action takes place each time that the lump of dough encounters a kneader or kneading rib. When the lump of dough reaches the discharge end of the mold board it discharges upon the inclined discharge chute 38 from which it falls upon a suitable conveyor which conveys it away for subsequent treatment. The flour sifter being in operation, a quantity of flour is always dusted into the discharge chute 38 and upon the rounded up lumps of dough as they pass therethrough.

In setting up the machine, if it is found necessary to locate the discharge end of the mold board at any other place around sides of the machine, the set screws 32$^a$ are loosened and the entire mold board, with the parts attached thereto, adjusted to bring the discharge chute at the position required after which the set screws are screwed up tight to clamp the supporting arms 32 and therewith the entire mold board upon the post or standard 17. If the mold board requires adjustment axially of the dough carrier, the set screws 32$^a$ are partly unscrewed and the adjustment bolt 34 turned in the proper direction to obtain the adjustment.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. The combination with a base and a rotatory bowl like carrier mounted thereon, of a spirally arranged mold board, stationarily supported on said base and contacting along its lower edge with the internal face of said carrier, and a series of kneading ribs on said mold board and located on the side thereof adjacent the internal face of the carrier, said kneading ribs being inclined with respect to the mold board and extending in the same general direction.

2. The combination with a base and a rotatory bowl like carrier mounted thereon, of a spirally arranged mold board, stationarily supported on said base and contacting along its lower edge with the internal face of said carrier, and a series of kneading ribs secured to said mold board on the side thereof adjacent the internal face of the carrier, said kneading ribs inclining upward from the lower edge of the mold board and extending in the same general direction as that taken by the mold board, the lower edge portion of each rib being relatively thin and the remainder of the surface portion of each rib being convex, the convexity increasing gradually from said thin flat portion to the middle portion of the rib.

3. The combination with a base and a rotatory bowl like carrier mounted thereon, of a spirally arranged mold board, stationarily supported on said base and contacting along its lower edge with the internal face of said carrier, and a series of kneading ribs secured to said mold board on the side thereof adjacent the internal face of the carrier, said kneading ribs inclining upwardly from the lower edge of the mold board and extending in the same general direction as that taken by the mold board, said kneading ribs being tapered and convex in part, the convexity gradually increasing from their lower ends toward a place approximately midway between their ends.

4. The combination with a base and a rotatory bowl like dough carrier mounted thereon, of a spirally arranged mold board stationarily supported on said base and contacting along its lower edge with the internal face of said carrier, the lower portion of said mold board being cone like and forming with the internal face of the carrier a substantially V shaped trough, the angle between the walls of said trough being greatest at the bottom of the trough and said angle becoming less as the trough approaches its upper end, the upper end portion of the mold board merging into a concave portion with the concave part facing the internal wall of the carrier.

5. In a rounding up machine, the combination with a base, a post stationarily secured thereto, and a rotatory bowl like dough carrier surrounding said post and rotatively mounted on the base, of a spirally arranged mold board stationarily supported on said post and contacting along its lower edge with the internal face of said carrier, said mold board extending from the bottom of the carrier to its upper edge and having a discharge chute at its upper end overhanging the upper edge of said carrier, said mold board together with its discharge chute being adjustable around the axis of said post whereby the discharge chute may be placed at any desired place around the machine.

6. The combination with a base, a post stationarily mounted thereon, and a rotatory bowl like dough carrier surrounding said post and rotatively mounted on the base, of a spiral mold board within the hollow of said carrier and contacting along its lower edge with the internal face of said carrier from the bottom of the carrier to the upper edge thereof, supporting arms extending from said post to said mold board and secured to said mold board, a discharge chute at the upper end of said mold board and secured to one of said supporting arms, and means for securing said last mentioned supporting arm upon said post at any desired position thereon, whereby the supporting arms, mold board and discharge chute may be located at any position around the post.

7. The combination with a base, a post extending up therefrom, a rotatory bowl like carrier mounted thereon, a spirally arranged mold board contacting with the internal face of the carrier, and supporting arms extending from said post and secured to said mold board, of a discharge chute secured upon one of said arms, a flour sifter above said discharge chute and supported by the arm which supports the discharge chute and agitator driving means for said sifter including a friction disc held in contact with said rotatory bowl like carrier.

8. In a rounding up machine, the combination with a rotatory bowl like dough carrier, of a stationarily supported, mold board supporting arm, a discharge chute secured to said arm, a flour sifter located above said discharge chute and secured to said arm, and agitator driving means for said flour sifter including a bearing bracket pivotally suspended from said supporting arm at one side of its center of gravity, and a friction disc rotatively mounted on said bearing bracket and held in frictional contact with said carrier by said bearing bracket.

9. In a rounding up machine, a flour sifter, and agitator driving means for said flour sifter comprising a bearing bracket suspended at a point at one side of its center of gravity, an agitator driving shaft journaled in said bracket, a friction disc on said shaft, and a rotatory bowl like dough carrier in frictional contact with said friction wheel.

10. In a rounding up machine, the combination with a rotatory bowl like dough carrier, of a spiral like mold board contacting along its lower face with the internal face of said carrier, and extending from the bottom to the top thereof, a discharge chute at the upper end of said mold board and overhanging the upper edge of the carrier, and a deflecting plate having a concave face extending from the mold board to the discharge chute.

FRANK STREICH.